United States Patent Office 3,146,522
Patented Sept. 1, 1964

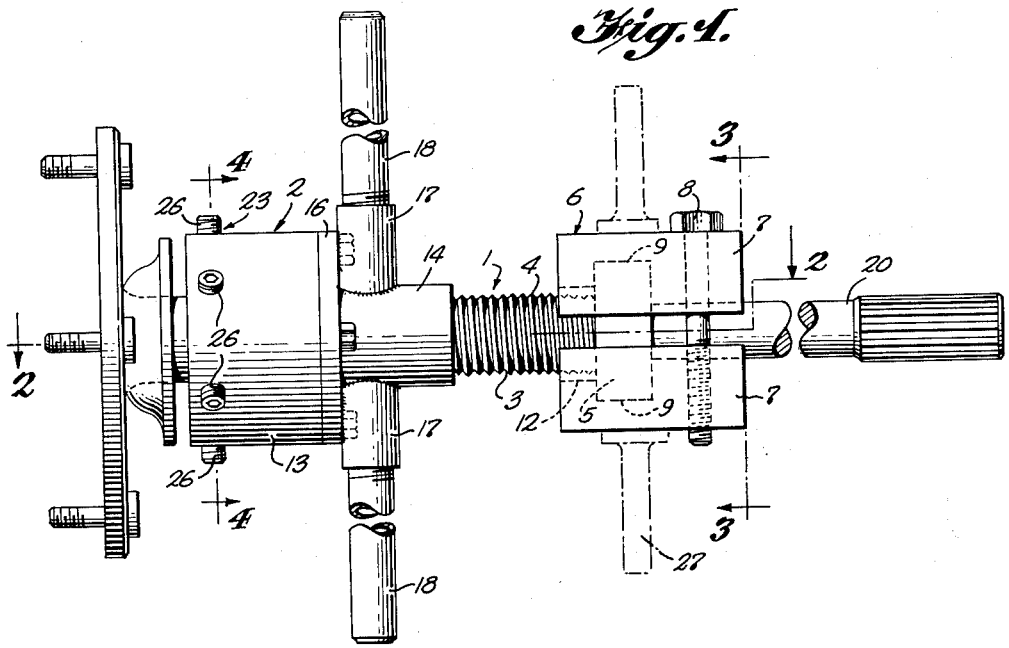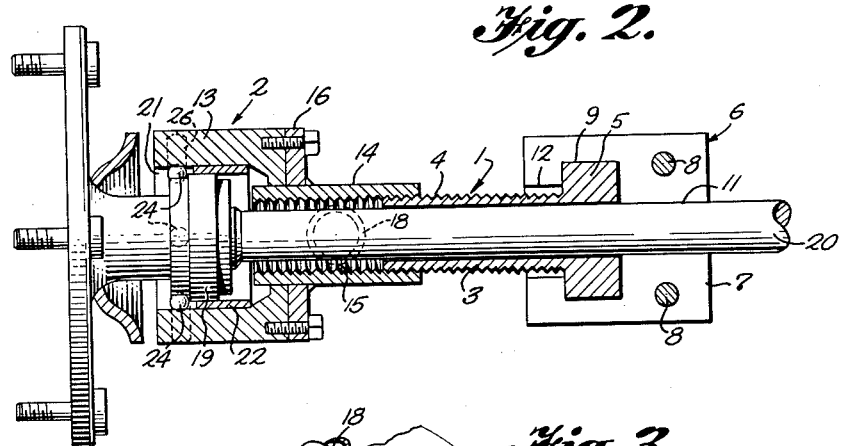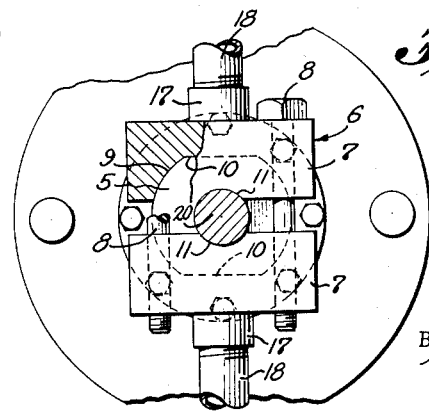

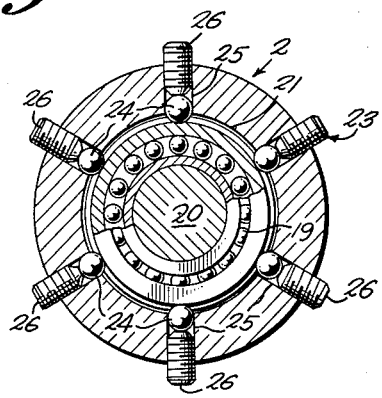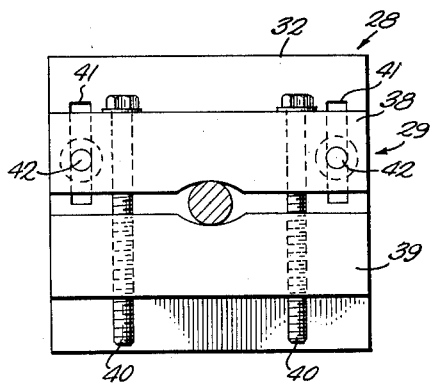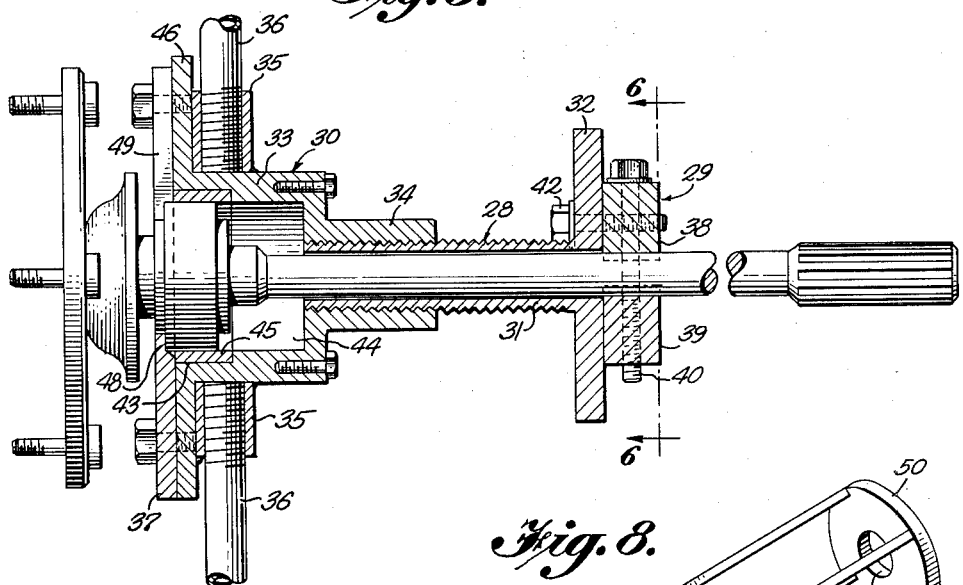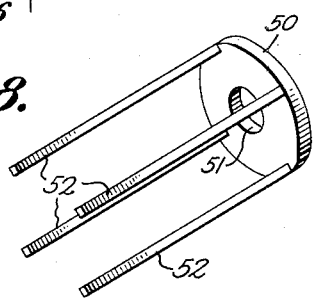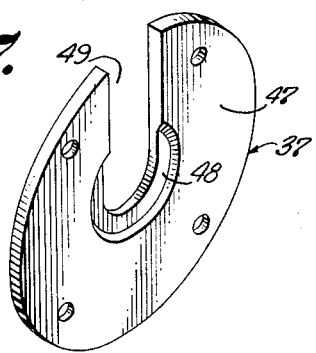

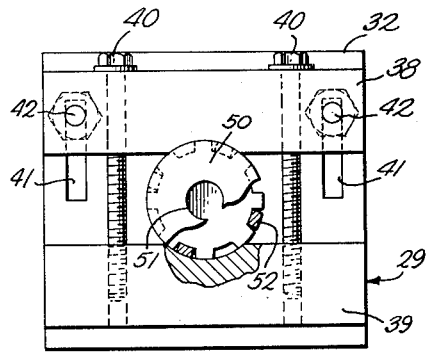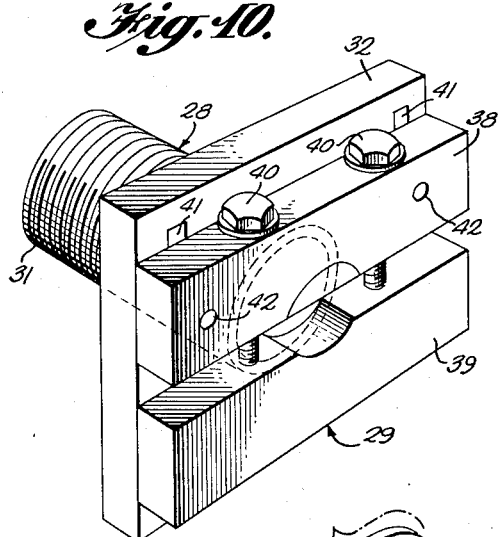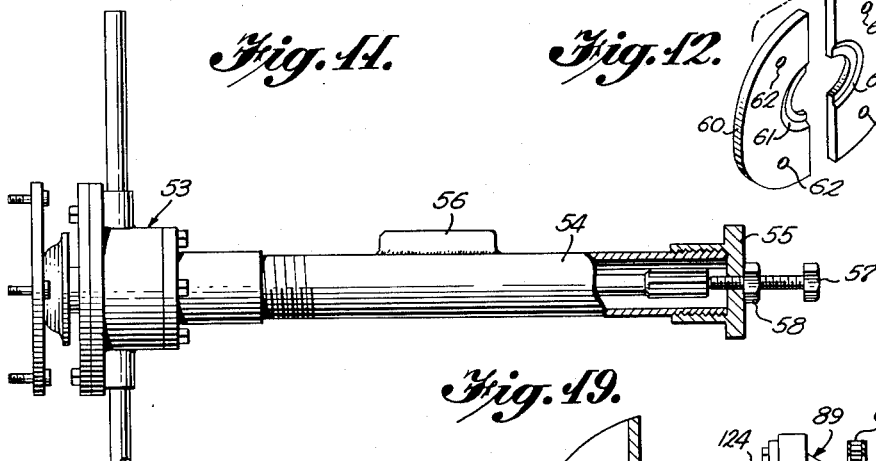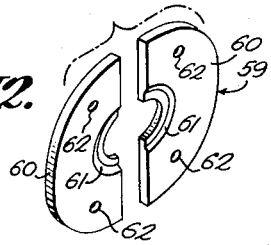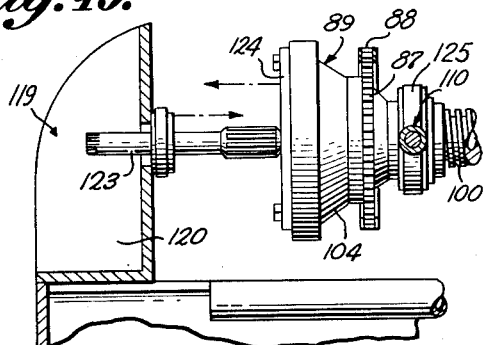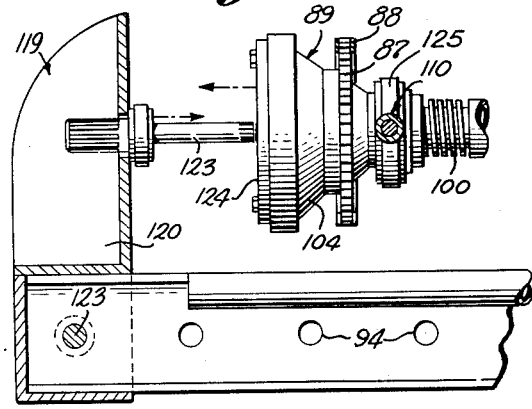

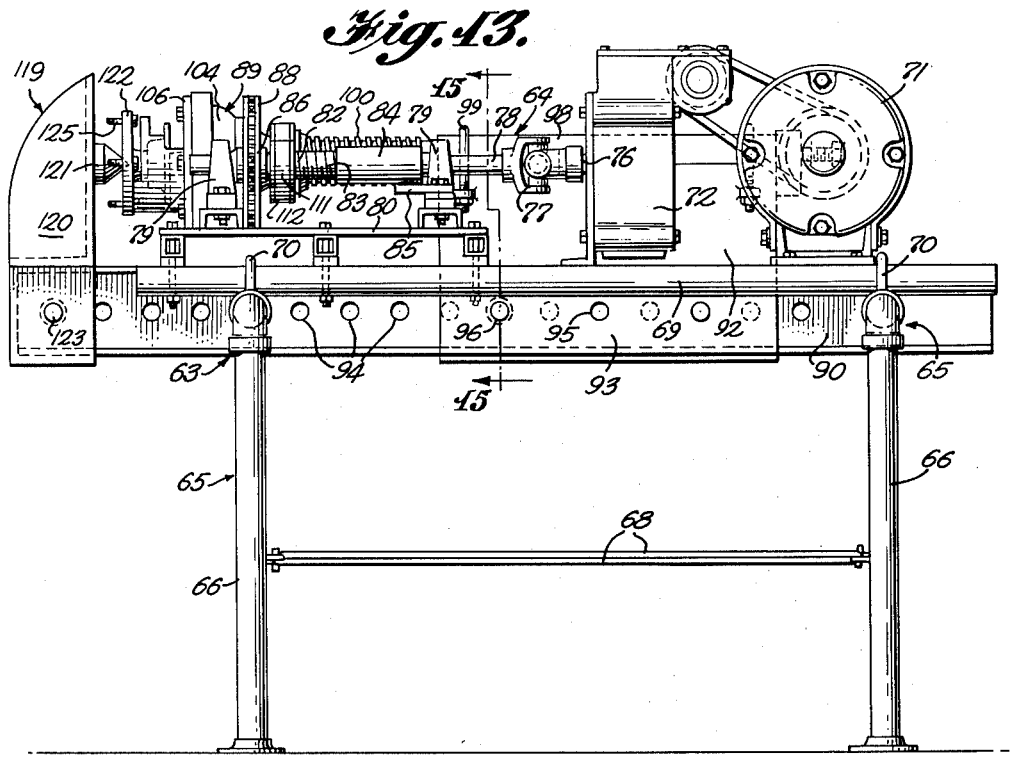
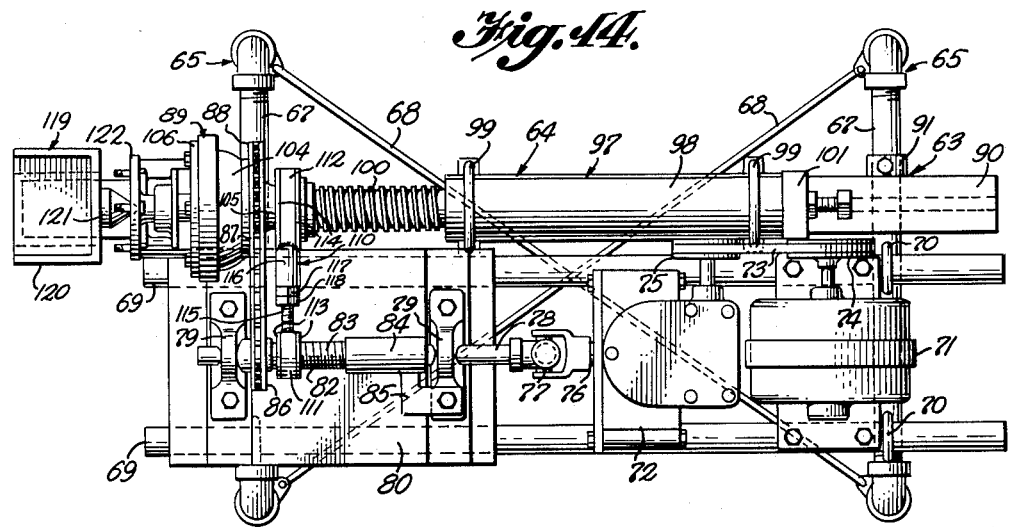

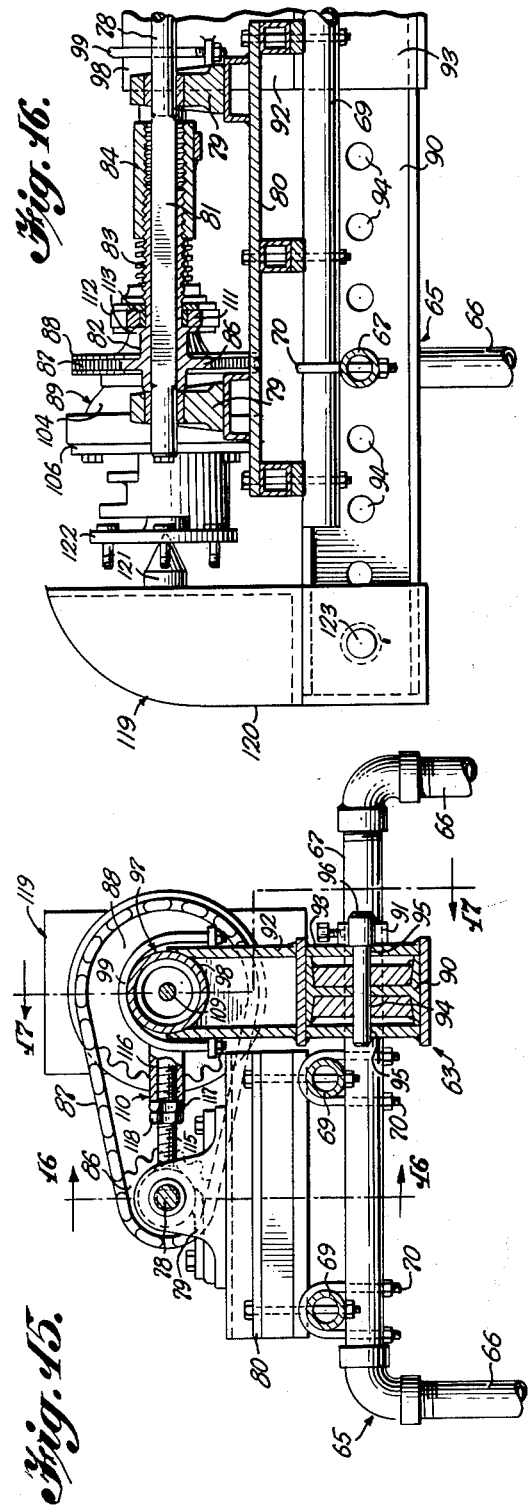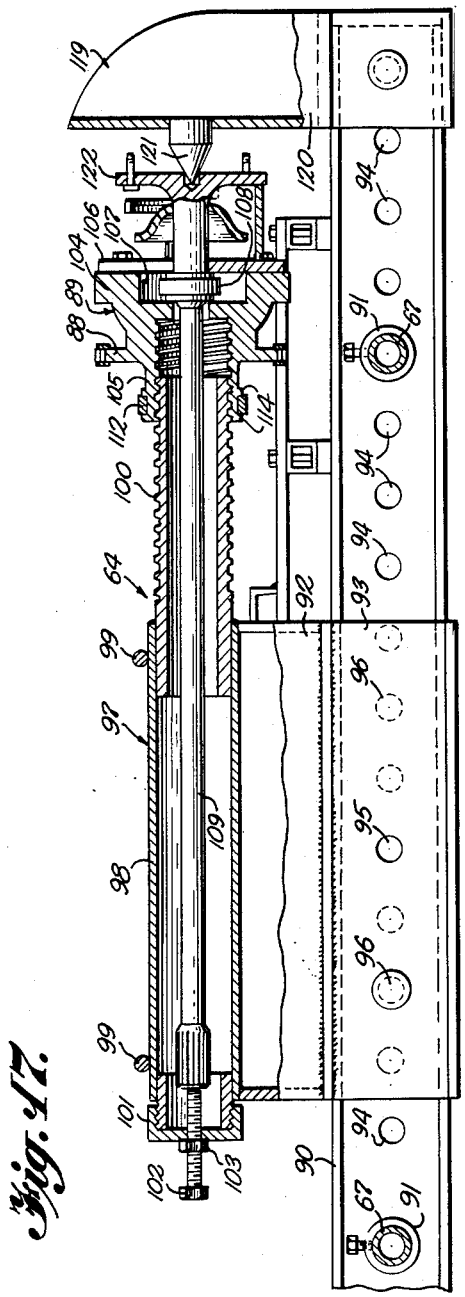

3,146,522
APPARATUS TO REMOVE ENCIRCLING OBJECTS FROM, AND PRESS THEM ON, SHAFTS
Thomas H. Wright, 110 Sydnor St., Mount Airy, N.C., assignor of one-half to Fred Folger, Jr., Mount Airy, N.C.
Filed Jan. 15, 1963, Ser. No. 251,529
10 Claims. (Cl. 29—256)

This invention relates to devices for removing one member from another, or placing one member upon another, where the members have a tight frictional fit, and particularly to devices for removing bearings, or other encircling objects from, or placing them on shafts.

Many different types of apparatus have been suggested for removing bearings and similar encircling objects from shafts. Although various principles have been proposed, and many devices have come into commercial use, none have proven entirely satisfactory. Due to the considerable force required to accomplish the purpose, most of the devices which have gotten into use, so far as is presently known, have been bulky and hard to handle.

The general purpose of the present invention is to provide improved apparatus for removing a bearing, gear, bushing, etc. from a shaft, or placing such an object upon a shaft.

A specific object of the invention is to provide such apparatus which will be capable of removing an encircling object from, or placing one on, a shaft, without need for auxiliary equipment.

Another object is the provision of equipment of this kind wherein a shaft will be held against axial movement, while a bearing-holding member can be caused to move in either direction axially of the shaft.

It is an object of the invention to provide a bearing removing device having manually operated means to move the bearing-holding means relative to an axially immovable shaft.

It is also an object to provide power driven means to move the bearing-holding means.

Other objects of the invention will become apparent from the following description of several practical embodiments thereof, when taken in conjunction with the drawings which accompany, and form part of, this specification.

In the drawings:

FIGURE 1 is a side elevation of a bearing remover, particularly adapted for use with short shafts, constructed in accordance with the principles of the present invention, an axle being shown in place in the apparatus;

FIGURE 2 is a longitudinal section through the device, taken on the line 2—2 of FIGURE 1;

FIGURE 3 is an end view of the structure, the shaft being cut along the line 3—3 of FIGURE 1;

FIGURE 4 is a transverse section through the bearing-holding member, and is taken on the line 4—4 of FIGURE 1;

FIGURE 5 is a longitudinal section similar to FIGURE 2, illustrating a modified structure;

FIGURE 6 is a view taken on the line 6—6 of FIGURE 5;

FIGURE 7 is a perspective view of a retainer plate used in the form of the invention shown in FIGURE 5;

FIGURE 8 is a perspective view of a holding member used when bearings are being moved on short shafts having splined ends;

FIGURE 9 is an end view of the device shown in FIGURE 5 with the holding member shown in FIGURE 8 in place;

FIGURE 10 is a perspective view of the shaft gripping element of the bearing remover;

FIGURE 11 is a side elevation, partly in section, of a still further modified form of the invention;

FIGURE 12 shows in perspective a modified form of retainer plate particularly adapted for use with the device shown in FIGURE 11;

FIGURE 13 is a side view of a power operated bearing remover incorporating the basic principles of the present invention;

FIGURE 14 is a top plan view of the machine illustrated in FIGURE 13;

FIGURE 15 is a transverse section through the machine, taken on the line 15—15 of FIGURE 13;

FIGURE 16 is a partial longitudinal section taken on the line 16—16 of FIGURE 15;

FIGURE 17 is a partial longitudinal section through the machine, taken on the line 17—17 of FIGURE 15;

FIGURE 18 is fragmentary view of a part of the machine illustrating removal of a bearing from a very short shaft; and FIGURE 19 is a view similar to FIGURE 18 showing a bearing being pressed on a shaft.

In general, the invention consists in bearing removing and replacing apparatus which includes a housing to encase a shaft wholly, or in part, with means to hold the shaft against axial movement in the housing. A bearing or other shaft encircling object-holding member is mounted for movement relative to the housing in a direction axially of the shaft position in the housing, and means are provided for moving the bearing-holding member along the housing. The means for moving the bearing-holding member may be manually operated or power operated.

Although the description refers to removing and replacing bearings, it is to be understood that the term bearing is merely illustrative of any member such as a gear, sleeve or other member having a pressed fit on a shaft or tube.

Referring to the drawings in detail, and first adverting to that form of the invention shown in FIGURES 1 through 4, the apparatus includes a shaft housing 1, and a bearing-holding member 2 mounted on the shaft housing.

The shaft housing 1 is in the form of a sleeve 3, externally threaded, as at 4, with an end flange 5. A clamp 6 is mounted on the end of the housing and is adapted to engage and hold a shaft in fixed position relative to the housing.

The clamp is a two-piece member, with the sections 7 being joined by clamping bolts 8. Each section of the clamp has a seat 9 to receive the housing flange 5. If the flange is flattened, as at 10, or otherwise given a non-round shape, the seats in the clamp sections conform to the flange shape, the flange can be held against rotation in the clamp without using clamping pressure upon the flange. This will permit the clamp to exert its full clamping pressure upon the shaft, as will be described. The sections of the clamp have arcuate recesses 11 in their confronting faces extending from the seats to one edge of each section. The recesses form saddles for seating on opposite sides of a shaft for clamping engagement with the shaft. Arcuate recesses 12, or other cutouts, extend from the seats 9 to the opposite edges of the clamp sections to accommodate the housing sleeve 3. These are sufficiently large so that no pressure will be put upon the sleeve when the bolts are tightened to draw the sections together to seat upon the flange 5 and clamp about the shaft.

The bearing-holding member 2 consists essentially of a bearing-receiving cup 13 carrying a hub 14 which is internally threaded, as at 15, for mounting upon the threaded sleeve of the housing. While it is obvious that the cup and hub could be made as an integral unit, they are shown as separate members. The hub 14 carries a flange 16 which is bolted to the bottom of cup 13. Bosses 17 project radially from hub 14 and provide sockets to receive lever arms 18 for use in rotating the hub on sleeve 3.

As best seen in FIGURE 2, the cup 13 receives bearings, such as the bearing 19 on axle shaft 20, within its chamber 21. If the bearing is smaller than the chamber an adapter ring 22 may be used so that the bearing will be positioned centrally of the cup chamber. The bearing will be held within the cup by retaining means 23, which serves also as an abutment against which the bearing presses during removal from the shaft. The retaining means of the form of the invention of FIGURES 1 to 4 consists of a plurality of retainer balls 24 mounted in passages 25 in the walls of cup 13, the passages being arranged radially to the cup chamber and equi-distant from one another about the cup. Each passage is threaded and receives a set screw 26 for moving, and holding, the balls in contact with a bearing in the chamber. The balls are adapted to be moved behind the peripheral rim of the bearing so as to prevent its removal from the chamber.

When it is desired to remove a bearing from a shaft, the shaft with the bearing is placed in the tool by inserting the shaft 20 through the cup into the sleeve 3 of the housing member. This movement is continued until the bearing 19 is wholly within the cup beyond the plane of the retaining balls 24. Screws 26 will be tightened to move the balls behind the bearing rim to prevent the bearing from being moved from the cup. Clamp 6 will then be tightened to draw its sections together to seat flange 5 of the housing member to hold it against rotation and to clampingly engage the shaft to fix it against axial movement relative to the clamp. As the clamp cannot turn relative to the housing member, or move axially of the housing member, the shaft will be fixed relative to the housing member. The clamp or part of the housing member, should be held against rotative movement, and this can be done by holding the clamp to a workbench or other fixed member, by means of a C-clamp 27, or vise, etc. If the bearing-holder is now rotated by means of the arms 18, it will move axially of the housing member. If the holder movement is toward clamp 6 and the shaft is held against movement, the bearing will be pressed against balls 25 and forced to move with the holder. When the bearing has been moved far enough, it will be beyond its seat on the shaft and free for removal. During this entire operation, the bearing is held within the cup, and if the bearing should burst, the parts would be confined within the cup.

When it is desired to place a bearing on a shaft, the bearing is placed in the cup and the shaft inserted through the bearing and clamped to the housing member. If the cup is now rotated so as to move it away from the clamp, the bearing will seat against the inwardly projecting end of hub 14 so that the bearing will be carried outwardly with the cup. This will force the bearing into its seat on the shaft.

In FIGURES 5 through 10 a slightly modified tool is shown. In this form also, there is a shaft housing member 28, clamp 29 and bearing holding member 30. The shaft housing includes threaded sleeve 31 and flange 32. The clamp 29 is carried by the flange. The bearing holder includes cup 33, hub 34, socket 35, carrying arms 36, and a retaining member 37.

In this form of the invention, flange 32 is considerably larger than in the previously described form and the clamp 29 is bolted to it. The clamp has sections 38 and 39 held together by clamping bolts 40. Flange 32 is provided with slots 41 through which bolts 42 pass. Bolts 42 are threaded into the clamp sections 38. By this arrangement, the sections may be clamped about a shaft by tightening bolts 40, and the clamp adjusted and fixed to flange 32 through bolts 42. This will permit some centering of the shaft relative to the housing.

The bearing-holder 30 except for the retaining means and its mounting, and the fact that an annular seat 43 is provided at the mouth of the cup chamber 44 to receive an adapter ring 45, is substantially the same as the one previously described. Adapter rings of various thickness may be provided to receive bearings of different diameters. The cup is provided with an annular flange 46 about its open end against which the retainer, in this instance a plate 47, may be attached by bolts. Plate 47 has a recessed bearing seat 48, and a slot 49 opens the seat to the edge of the plate so that the plate can be slipped over a shaft and seat a bearing after the shaft and bearing are in place in the tool.

It will be clear that this form of tool will be operated in the same manner as the one first described.

When it is necessary to remove a bearing from a very short shaft, particularly one having a splined end where the splines will be in the area to be clamped, some means should be employed to prevent damage to the splines from pressure of the clamp on the splines. A device to serve this purpose is shown in FIGURE 8 and in use in FIGURE 9. The device consists of an end plate 50, having a central opening 51, with relatively thin fingers 52 projecting from one side of the plate. The fingers are parallel to one another and arranged to fit into grooves of the splined area and project above the surface of the shaft. With this arrangement, the clamp will bear upon the fingers, and the fingers, seated in the spline grooves, will prevent rotation of the shaft.

Still another form of the invention is shown in FIGURE 11. Here, the bearing-holding head 53 is threaded onto an elongated sleeve 54, which has a cap 55 threaded upon its opposite end. No clamp is used in this form, but a rib 56 is provided at one side of the sleeve for placement in a vise, or for clamping to a bench, or other surface. The shaft from which the bearing is to be removed is held against axial movement relative to the housing sleeve by means of a stop screw 57 threaded through the cap 55 for engagement with the end of the shaft. A lock nut 58 is provided to hold the screw in position of adjustment. In all other respects, the tool shown in FIGURE 11 is the same as those previously described. The sleeve and cap can be used with the bearing holder and threaded hub of the forms previously described.

FIGURE 12 shows a modified retainer plate 59 which can be used with the tools shown in FIGURES 5 and 11. The plate is in two sections 60, each having one-half of a circular bearing 61. The half-sections may be placed about a shaft in position in the tool and secured to the bearing cup by bolts passed through the holes 62.

The underlying principles of all of the foregoing forms, and the specific structure disclosed, are adaptable to power operation. In FIGURES 13 through 17 a power operated tool is shown which includes a bearing tool very similar to the one shown in FIGURE 11.

Referring to FIGURES 13 to 17, a frame 63 is shown upon which a bearing tool 64 and the means to operate it are mounted. The frame is composed of a pair of inverted U-shaped supports 65, spaced apart to underlie the ends of the machine. Each support includes legs 66 and a cross-member 67. The two supports may be interconnected near their bottoms by tie rods 68. The cross members of the supports are connected by a pair of spaced, parallel bed rails 69, fixed to the respective cross-members by U-bolts 70. A reversible motor 71 is mounted on the bed rails near one end, and a speed reducer 72 is secured to the rails adjacent the motor. A belt 73 travels over the motor drive pulley 74 and the speed reducer pulley 75 so that the motor will drive the speed reducer. The speed reducer output shaft 76 is connected through universal joint 77 with a drive shaft 78. Shaft 78 is journalled in bearings 79 which are mounted upon a base plate 80 carried by the rails 69.

The central portion 81 of drive shaft 78, that is the portion between bearings 79, is square, or other non-round shape, and carries a sleeve 82 which is centrally apertured to correspond to the cross-sectional shape of the portion 81 of shaft 78. Sleeve 82 is free to slide lengthwise of the squared sections of shaft 78 but will rotate with the shaft. Sleeve 82 is externally threaded for the major part of its length, as at 83, for engagement with an internally threaded tube 84. Tube 84 is held stationary by means of an arm 85 bolted to the base plate 80. This construction will result in sleeve 82 moving in or out of the tube when the drive shaft 78 is rotated. Sleeve 82 has a sprocket 86 fixed to it for rotation and longitudinal movement with it. A chain 87 around sprocket 86 and a sprocket 88 fixed to the bearing holder 89 of the tool 64 will cause the bearing-holder to rotate whenever the drive shaft turns.

The tool 64 is mounted parallel to drive shaft 78 upon a guide rail 90. The rail is a reinforced I-beam, and is provided with openings through which the cross-members 67 to the supports 67 extend. Bosses 91 project from the rails about the openings and contain set screws for fixing the position of the rail on the cross-members. The tool is supported upon a pedestal 92 having a rail-surrounding boxing 93 at its bottom. The boxing forms a slide for movement along the rail. A plurality of openings 94 are provided in the rail and openings 95 are in the slide. Pins 96 through the holes 95 and selected holes 94 fix the slide, and the tool, in desired positions of adjustment along the rail.

The tool consists of a shaft housing 97 and the bearing holder 89. The shaft housing is an elongated tubular member 98 mounted on pedestal 92 by U-bolts 99 and having a portion of its length externally threaded, as at 100, and projecting beyond the pedestal. The opposite end of the tubular member is closed by a cap 101. An abutment screw 102 is threaded through the end of the cap for abutment with a shaft in the tool. A lock nut 103 holds the screw in positions of adjustment.

Bearing-holding member 89 includes a cup 104, a hub 105 and retaining member in the form of a plate 106. Plate 106 can be similar to plate 47 of the form of tool shown in FIGURE 5. Cup 104 has a chamber 107 to receive a bearing 108 mounted upon a shaft 109. Sprocket 88 is fixed to the cup portion of the member 89.

As mentioned above, sleeve 82 will move axially of the drive shaft 78 when the drive shaft is rotated, and consequently sprocket 86 will move axially of the shaft. Bearing holder 89 will move axially of the tool 64 when it is rotated upon the threaded portion 100 of the shaft housing member. Thus sprocket 88 moves axially of the tool. As the sprockets 86 and 88 are connected by chain 87 it is essential that the two move at the same linear speed along the machine. To this end, the threads 83 on sleeve 82 and the threads 100 on the shaft housing member of the tool are formed so as to provide equal linear travel for the two sprockets at their relative speeds of rotation. Threads 100 are a faster pitch than threads 83 to accommodate for the slower rotational speed of the tool bearing-holding member.

As the two members will be travelling at the same speed, they can be connected. A connecting rod 110 rigidly joins the sleeve 82 and bearing holder 89. The rod has a bearing end 111 journalled on the sleeve 82 and a bearing end 112 journalled on the bearing holder. Spaced annular ribs 113 and 114 on the members 82 and 89, respectively, maintain the bearing ends against side movement. The rod is made adjustable lengthwise by having a threaded stud 115 connected to one bearing end and inserted into a sleeve 116 fixed to the other bearing end. An adjusting nut 117 and a lock nut 118 will hold the rod in adjusted position. The rod is used to hold the tool end in proper parallel relation to the drive shaft 78, and to take care of lateral pulling forces exerted by the drive chain on the unsupported end of the tool projecting beyond the pedestal 92.

At one end of the machine, that is at the end adjacent the bearing holder of the tool, there is a combination shaft-centering and abutment member 119 mounted on the guide rail 90. This includes a vertical post 120, secured to the rail 90, carrying a centering pin 121. The pin is adapted to engage the center of a shaft, or shaft flange such as flange 122 on shaft 109.

In using the power operated tool, the shaft 109 with its bearing 108 is put into the tool by inserting the splined end of the shaft into the bearing holder and then into the shaft housing member. The abutment member can be removed from the machine by removing pin 123 which fastens it to the guide rail, to facilitate positioning of the shaft and bearing. If the bearing holder is too far advanced on screw 100, the motor can be started and the bearing holder run back on the screw until the bearing 108 is fully within the cup 104 of the bearing holder. If the screw 102 is not in contact with the shaft end, it can be adjusted. The abutment 119 will be replaced, and retaining plate 106 slipped over the shaft and bolted to the bearing holder. When the motor is started, shaft 78 will rotate and sleeve 82 and sprocket 86 will rotate with it, driving chain 87 and rotating sprocket 88 and bearing holder 89. Even though sprocket 88 is larger than sprocket 86 to get a speed reduction between shaft 78 and the bearing holder, sleeve 82 and bearing holder 89 will advance lengthwise of the machine at precisely the same speed due to the different pitch of screws 83 and 100. Movement of the bearing holder will bring the retainer plate 106 into contact with bearing 108 and cause the bearing to move with it. As the shaft is held against axial movement, the bearing will be forced from its seat.

In putting a bearing in a shaft, the bearing is placed in the chamber of cup 104 and the shaft then inserted as before. The bearing holder will be run up on the screw 100 close to the pedestal 92 at the start of this operation. The motor will be started in a reverse direction to cause the bearing holder to move toward the end abutment 119. The bottom of the bearing holder cup will contact the bearing and press it toward abutment 119. As the shaft is in contact with this abutment and cannot move, the bearing will be pressed upon its seat.

With very short shafts, bearings can be removed by using the abutment 119 as the member against which the bearing will rest. The center pin 121 will be removed, and the shaft 123 will be inserted through the center opening in the abutment until the bearing comes to rest against the abutment as shown in FIGURE 18. The shaft end will contact a solid plate 124 bolted over the open end of cup 104. It will be obvious that when the machine is operated to run the bearing holder toward abutment 119, the shaft will be moved axially through the bearing 125.

FIGURE 19 shows the reverse operation to that just described, with a bearing being pressed onto a shaft. Here, again, the bearing 125 rests against abutment 119 and the shaft is pushed into the bearing.

The machine may be used also to press wheel bolts out of a wheel flange fixed to an axle. For example, if a shaft is set up in the machine as shown in FIGURE 13, the center pin 121 is removed from the abutment 119, the bolts 125 can be removed from the wheel flange 122 by running the bearing holder toward the abutment. This will cause the bolts to engage the abutment and be pressed from the flange as the flange approaches the abutment.

It will be evident that the apparatus disclosed is capable of use in other manners than those described, but as at least one example has been given of the use of each of the different arrangements shown, it is not thought necessary to set out all of the uses.

While in the above several practical embodiments of the invention have been disclosed, it will be understood

What is claimed is:

1. Apparatus for removing encircling objects from, and pressing them on, shafts comprising, a shaft housing member and an object-holding member threadedly connected in axial alignment so that rotation of one member relative to the other will cause it to move longitudinally of the other member, means carried by the shaft housing member to hold a shaft within the housing against axial movement in one direction longitudinally of the shaft housing member, the object-holding member having a chamber in alignment with the shaft housing member to receive an object to be removed from or pressed on a shaft, retaining means carried by the object-holding member to engage an object within the chamber and prevent the object from moving from the chamber, and means carried by one of said members by which that member can be rotated to cause it to move longitudinally of the other said member.

2. Apparatus for removing encircling objects from, and pressing them on, shafts comprising, a tubular shaft housing member externally screw-threaded at one end, means carried by the shaft housing member to hold a shaft within the housing member against movement in one direction axially of the shaft housing member, an object-holding member having an internally threaded hub screwed onto the threaded end of the shaft housing member, the object-holding member including a cup having a chamber coaxial with and open to the hub to receive an object about a shaft in the shaft housing member and projecting through the object-holding member chamber, retaining means carried by the cup to hold an object within the cup chamber, and means connected to the object-holding member by means of which the object-holding member can be rotated on the shaft housing member to cause the object-holding member to move longitudinally of the shaft housing member.

3. Apparatus for removing encircling objects from, and pressing them on, shafts as claimed in claim 2 wherein, the means for holding a shaft against axial movement within the shaft housing member includes a closure for the end of the tubular member opposite the object-holding member, and an abutment screw projecting through the closure axially into the tubular member.

4. Apparatus for removing encircling objects from, and pressing them on, shafts as claimed in claim 2 wherein the retaining means comprises, means mounted in the cup projectable into the chamber at spaced points around the chamber in a plane normal to the axis of the object-holding member remote from the juncture of the cup and hub, and means to hold the projectable means against withdrawal from the chamber.

5. Apparatus for removing encircling objects from, and pressing them on, shafts as claimed in claim 2 wherein the retaining means is a plate removably attached to the cup to close the chamber and having a central opening to accommodate a shaft projecting through the chamber.

6. Apparatus for removing encircling objects from, and pressing them on, shafts as claimed in claim 2 wherein the means to hold a shaft in the shaft housing member against movement comprises, a clamp having jaws to engage the shaft, and means to couple the clamp to the tubular member.

7. Apparatus for removing encircling objects from, and pressing them on, shafts as claimed in claim 6 wherein the means to couple the clamp to the tubular member includes, a flange on the tubular member, the clamp having a pair of sections each carrying a shaft engaging jaw and having a seat to receive a part of the flange, and means to hold the sections with the flange in the seats and the jaws engaging the shaft.

8. Apparatus for removing encircling objects from, and pressing them on, shafts as claimed in claim 6 wherein the means to couple the clamp includes, a flange on the tubular member, the flange having slots therein, the clamp having two sections each carrying a shaft engaging jaw, means to draw the sections together to clamp the jaws about a shaft, and means projecting through the slots in the flange to adjustably connect one of the sections to the flange.

9. Apparatus for removing encircling objects from, and pressing them on, shafts as claimed in claim 2 wherein there is an adapter ring seatable in the cup chamber having a central opening of proper size to receive the object to be moved.

10. Apparatus for removing encircling objects from, and pressing them on shafts as claimed in claim 2 wherein the means by which the object-holding member can be rotated comprises, arms radially projecting from the object-holding member.

References Cited in the file of this patent

UNITED STATES PATENTS

| | | |
|---|---|---|
| 1,108,135 | Claton et al. | Aug. 25, 1914 |
| 1,463,031 | Bakels | July 24, 1923 |
| 2,352,739 | Sauer | July 4, 1944 |
| 2,953,930 | Meyer | Sept. 27, 1960 |
| 3,029,654 | Hill | Apr. 17, 1962 |